Feb. 14, 1928.

M. G. BENJAMIN

BOILER FEED REGULATION

Filed July 23, 1921   3 Sheets-Sheet 2

INVENTOR.
Merrill G. Benjamin
by Byrnes, Stebbins, Burgess Parmelee
his Attorneys Patented Feb. 14, 1928.

1,659,552

UNITED STATES PATENT OFFICE.

MERRILL G. BENJAMIN, OF LAKEWOOD, OHIO, ASSIGNOR, BY MESNE ASSIGNMENTS, TO BAILEY METER COMPANY, A CORPORATION OF DELAWARE

BOILER-FEED REGULATION.

Application filed July 23, 1921. Serial No. 486,926.

The present invention relates to boiler feed regulation and more particularly to a system whereby the water feed is made uniform or equalized over the entire battery of boilers. It also relates to the proper correlation of the air, fuel and water supply for a steam boiler and its furnace at varying rates of combustion.

The invention is shown in connection with the system of furnace control described in the patent to Lawrence J. Hess and myself, No. 1,518,924, granted December 9, 1924. The Hess and Benjamin system correlates the air and fuel supplies for the individual units in accordance with a function of the entire battery of boilers, such for example as the steam pressure in the main header, or the steam flow from the battery.

The present invention is an improvement by means of which the feed water for all of the individual boilers is controlled in accordance with said function of the entire battery, whereby the boiler feed is equalized over all of the boilers operating. The result is a more perfect equalization among the individual units of the load carried by the battery.

The equalized load permits the most efficient operation of the boilers. All of the boilers operating can be depended upon to carry their proper share of the load. Thus a fewer number of boilers will be required than is the case where the load is unequally carried by the different boilers. The same load may therefore be carried by a battery of smaller rated capacity and the first cost thereby reduced. Moreover, by equalizing the load over all of the boilers the variations in individual boilers and their furnaces is minimized. This produces economy, as the less variation the better the efficiency. Moreover, the life of the brick work and other parts is increased. In the system herein described, several units of a battery are automatically controlled in accordance with some function of the battery, such as the steam pressure in the main header or the steam flow, so that the draft, the fuel supply and the water supply are equalized over the entire battery.

In the drawings, the invention is illustrated as embodied in conjunction with the Hess & Benjamin system of draft and fuel feed control, in which a motor generator set is controlled in accordance with some function of the entire battery and serves as a master regulator for controlling in turn the drafts and stokers of the individual units. In the drawings which illustrate the preferred embodiment of the invention as so employed.

Figure 1:
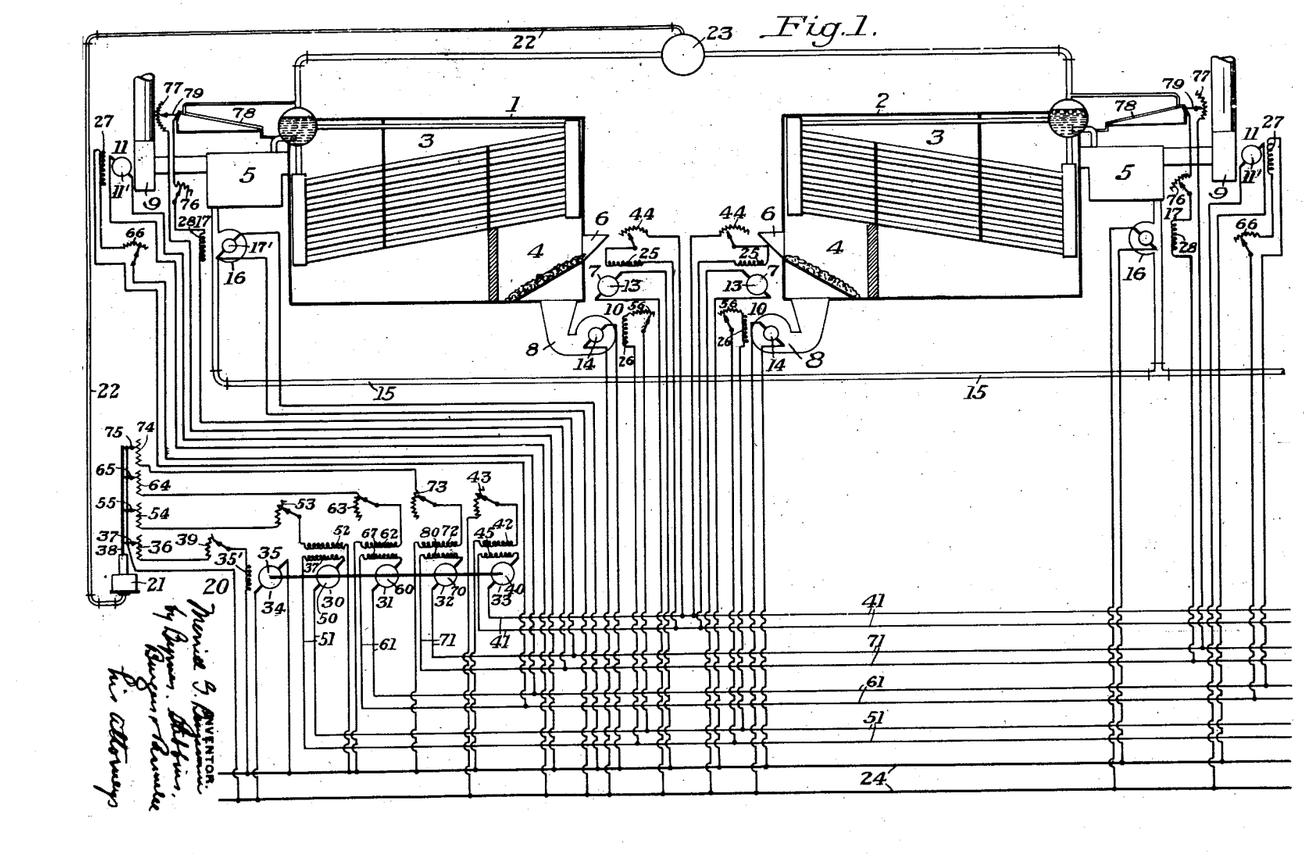
Figure 1 is a diagrammatic view of the regulating system.

In the illustrated embodiment of the invention reference numerals 1 and 2 indicate generally two units of a battery of steam boilers. Ordinarily a considerably larger number of units are employed in the battery, but two units only are shown for purposes of illustration. Each unit comprises a steam boiler 3 and its furnace 4. The boilers are shown as provided with economizers 5. The furnaces are fed by power-operated stokers 6, driven by electric stoker motors 7. The stokers may be of any suitable form, such as underfeed or chain grate stokers.

The air supply or draft is controlled by forced and induced draft fans 8 and 9, respectively. The forced and induced draft fans are driven by electric fan motors 10 and 11, respectively. While it is preferred to use both forced and induced draft fans as set forth in the Hess and Benjamin application, the induced draft fan may be omitted or the draft may be otherwise controlled, so long as the draft conditions are equalized over the units of the battery.

The feed water is supplied from a feed water main 15 in which the water is maintained under a constant pressure by some means such as a suitable pressure-regulated pump or by other means supplied as required. The feed water is fed from the feed water main 15 to the boilers by means of booster pumps 16, one for each boiler. The booster pumps are driven by electric motors 17.

The draft controlling means, the stokers and the feed water pumps 16 of all the units are all controlled by a master regulator, which comprises a motor generator set indicated generally by reference numeral 20, the speed of which is varied by means of a steam pressure regulator 21, which is connected by pipe 22 to the main steam header 23 of the battery.

The armature 13 of the stoker motors 7, the armatures 14 of the forced draft fan motors 10, the armatures 11′ of the induced draft fan motors 11, and the armatures 17′ of the feed water pump motors 17 are all supplied with current from constant voltage direct current feeder mains 24. The speeds of the several motors 7, 10, 11 and 17 are regulated by the currents supplied to the respective shunt fields 25, 26, 27 and 28, respectively. The currents for such shunt fields are supplied by the variable speed, variable voltage generators 30, 31, 32 and 33 of the variable speed motor generator set 20. The motor generator set is driven by the motor 34, the speed of which is controlled in accordance with the steam pressure in the main steam header 23 of the battery by means of the steam pressure regulator 21. The armature 35 of the motor 34 is supplied with a constant voltage current from the constant voltage direct current feeder mains 24. The shunt field 35′ of this motor also receives its current from the feeder mains 24. The current in the shunt field 35′ of this motor is varied to vary the speed of the motor by means of a rheostat 36 having a movable contact 37 on the vertically movable arm 38 of the steam pressure regulator 21. The steam pressure regulator 21 is a device well known in this art and is therefore not illustrated in detail. The well known Mason regulator is preferably employed, although other makes of regulators may be used. The contact bearing arm 38 assumes various positions in accordance with the steam pressure. The regulator is so compensated that the arm 38 has a step-by-step movement, assuming a definite position for any particular steam pressure throughout its range of operation. As illustrated in the drawings, the arm 38 is shown as vertically movable, falling with a decrease in steam pressure and rising with an increase in steam pressure. When the steam pressure decreases the arm 38 and the movable rheostat contact 37 descends, cutting resistance out of the rheostat 36, thereby increasing the strength of the motor field 35′, and decreasing the speed of the motor generator set. When the steam pressure increases the reverse operation takes place and the speed of the motor generator set is increased. Since the contact point 37 is moved with a step-by-step movement along the rheostat 36, the speed of the motor generator set is regulated in accordance with the steam pressure. The relation of the motor generator set speed to the steam pressure will hereafter be described in greater detail. A hand operated rheostat 39 is interposed in the leads of motor field 35′, so that the speed can be adjusted manually in accordance with particular furnace operating conditions. This hand operated rheostat is not depended upon for regulation in accordance with the variations in the load, but is rather in the nature of a permanent adjustment which may be set once for all or may be readjusted occasionally upon variation in the character of the fuel, etc.

The armature 40 of the generator 33 for the stoker motor is connected to leads 41, from which is taken the exciting current for the fields 25 of the stoker motors 7 of the several furnaces. The shunt field 42 of the generator 33 is connected across the constant voltage supply mains 24. A manually adjusted rheostat 43 is inserted in the field circuit. The voltage of the current supplied by the generator 33 varies in accordance with the speed of the motor generator set, which in turn is varied in accordance with the demand for steam, as shown by the steam pressure regulator 21. When the steam pressure decreases, indicating an increased load, the motor generator set decreases in speed, thereby decreasing the voltage supplied by the generator 33 to the fields of the stoker motors 7, and thereby weakening the stoker motor fields and increasing the stoker motor speeds to supply more fuel. The hand rheostat 43 is in the nature of a permanent adjustment, which may be set once for all or readjusted occasionally when it is necessary to adjust the stoker motor speeds with respect to the draft and boiler feed water appliances. Each stoker motor has a manually adjustable rheostat 44 in series with its field. This rheostat allows hand regulation of each stoker motor. This hand regulation is in the nature of a permanent adjustment and may be readjusted occasionally to correct any irregularities in the operations of the individual stokers. The generator 33 has a series field 45 of such strength that the voltage at any given speed will be maintained constant for variations in the load imposed upon the generator by throwing on or off a different number of stoker motor fields. This renders the regulation independent of the load thrown upon the regulating device by a greater or smaller number of units.

The generator 30 for the forced draft fan motors has its armature 50 connected to the leads 51, from which is taken the exciting current for the fields 26 of the forced draft fan motors 10 of the several furnaces. The field 52 of the generator 30 is connected across the constant voltage feeder mains 24. A manually adjustable rheostat 53 is interposed in the field circuit. This rheostat is in the nature of a permanent adjustment, or may be adjusted occasionally when it is desired to adjust the speed of the forced draft fans as a whole with relation to the other devices. An automatically adjustable rheostate 54 is also included in the circuit of the field 52. This rheostat has a movable contact 55 which is carried on the vertically movable arm 38 of the steam pressure regulator 21. The action of the rheostat 54 is to modify the variations in voltage of the generator 30 which are due to the variations in speed of the motor generator set. When the arm 38 of the steam pressure regulator rises thereby increasing the resistance in the rheostat 36 of the motor generator set 34 to increase its speed, the same movement increases the resistance in the rheostat 54 of the field 52 of the generator 30. The effect of increasing the speed of the motor generator set is to increase the voltage of the generator 30 but such tendency is counteracted in part by the increase in the resistance of the circuit of the generator field 52. In consequence of this the variation in the voltage of the generator 30 upon variations in speed of the motor generator set are not as great as the variations in the voltage of the generator 33, whose voltages are due entirely to the variation in speed of the motor generator set.

Each forced draft fan motor 10 has a manually adjustable rheostat 56 in series with its field whereby an individual manual adjustment of the speeds of the individual forced draft fans is permitted. Such adjustments are in the nature of permanent or semi-permanent adjustments whereby the relative speed of one fan may be varied with relation to the speeds of the other forced draft fans. Such adjustment does not affect the automatic variation of the speeds of all of the forced draft fans as a system in accordance with the variations in the steam pressure. The generator 30 has a series field 37 of such strength that its voltage at any given speed will be maintained constant for variations in the load thrown on such generator, as for example by throwing on the fields of a different number of forced draft fan motors when different numbers of boilers are put into or out of commission.

The generator 31 for the induced draft fan motors has its armature 60 connected with leads 61, from which is taken the current for the shunt fields 27 of the motors 11 of the induced draft fans. The shunt field 62 of this generator is connected across the constant voltage supply mains 24. A hand operated rheostat 63 is interposed in the field circuit whereby the speeds of the induced draft fans as a system may be manually adjusted with respect to the other appliances when occasion demands. An automatically regulated rheostat 64 is also included in the circuit of the field 62. This rheostat has a movable contact 65 carried on the vertically movable arm 38 of the steam pressure regulator 21. The operation of this rheostat is similar to that of the rheostat 54 of the generator 30. It serves to modify the voltage of the generator 31 so that its voltage does not exactly follow the variations in speed of the motor generator set. The rheostats 54 and 64 have their resistance values so selected that the voltages of the generators 30 and 31 will have proper variations for the different speeds of the motor generator set. The computation of such voltage variations is hereinafter described in detail.

Each of the induced fan motors 11 has a manually adjustable rheostat 66 in series with its field. These manually adjustable rheostats provide means for adjusting the speed of the different induced draft fans relative to each other to meet inequalities in the conditions encountered in the individual furnaces. These manual adjustments are in the nature of permanent or semi-permanent adjustments. They do not affect the regulation of the induced draft fans taken as a system in accordance with the various loads. The generator 31 has a series field 67 of such strength that its voltage at any given speed will be maintained constant irrespective of the number of induced draft fan motors whose fields may be thrown upon the generator 31.

The generator 32 for the feed water pump motors 17 has its armature 70 connected to leads 71, from which is taken the exciting current for the fields 28 of the feed water pump motors 17 of the several furnaces. The field 72 of the generator 32 is connected across the constant voltage feeder mains 24. A manually adjustable rheostat 73 is interposed in the field circuit. This rheostat is in the nature of a permanent adjustment whereby the speeds of the feed water pumps as a whole may be adjusted with relation to the draft and stoker appliances. An automatically operated rheostat 74 is also included in the circuit of the field 72. The rheostat 74 has a movable contact 75 which is carried on the arm 38 of the steam pressure regulator 21. The operation of the rheostat 74 is similar to that of the rheostats 54 and 64. It serves to modify the voltage of the generator 32, so that it does not exactly follow the variations in the speed of the motor generator set. It furnishes a means for accurately correlating the speed of the feed water pump system to the speeds of the fan and stoker systems.

Each of the feed water pump motors 17 has a manually adjustable rheostat 76 in series with its field. These manually adjustable rheostats provide a means for manually adjusting the speeds of the feed water pumps relative to each other to meet inequalities in the conditions encountered by the individual feed water pumps. The feed water pumps at the end of the feed water main 15 farthest from the supply, will receive their water at somewhat less pressure than at the feed water supply end of the feeder main 15 and consequently may have to have their rheostats 76 set so as to run at a somewhat higher speed to make up for such lower pressure. These adjustments are in the nature of a permanent or semi-permanent adjustment and do not affect the operation of the feed water pumps as a whole.

Other rheostats 77 are also interposed in the circuits of the fields 28 of the feed water pump motors. The rheostats 77 are controlled in accordance with the water lines of the individual boilers, each boiler being provided with a rheostat 77 and its controlling mechanism. The controlling mechanism for a rheostat 77 may be any of the standard devices which will produce mechanical motion in accordance with the variations of the water line in the boiler. For the sake of illustration a regulator of the Copes thermostatic type is shown, although the rheostat 77 may be controlled by other types of regulators, such for example as those employing floats controlled by the water line in the boiler. This regulator has an expansible tube 78 which is connected with the contact or arm 79 of the rheostat 77. The tube 78 is set on incline so that it is filled partly with steam and partly with water. If the water level in the boiler falls the steam occupies a greater length of the tube 78, thereby heating a greater length of said tube. The expansion of the tube 78 in accordance with the variations in the length of the tube heated by the steam, operates to move the arm 79 along the rheostat 77. As shown in the drawings, the arm 79 is moved up by an increased expansion of the tube 78 due to a fall of the water line in the boiler. This puts more resistance in the field 28 of the motor 17, thereby increasing the speed of the feed water pump 16 to supply more water to that boiler. The rheostat 77 has a limited range so that it does not furnish the major part of the regulation of motor 17 but serves rather to modify the speed of the motor 17. In most cases the rheostats 77 can cause a variation in the speed of the motor 16 not greater than about 15% to 20%. Even if the feed water is supplied to the boiler continuously in exactly the same amount as the water carried off in steam, nevertheless the water line in the boiler will fluctuate, particularly when the load varies from moderate to very high ratings. If the load on a boiler increases from 50% rating to 300% rating and the feed water supply is increased in exactly the same ratio, the water level in the boiler will rise. This is because of the boiling of the water and the formation of bubbles. The rheostats 77 operate to correct this, as follows:—

If the load on the boiler increases from a low or moderate rating to a very high rating, the formation of the bubbles will raise the water level in the boiler and fill with water a greater amount of the tube 78, whereupon it will contract and the contact 79 will be moved downwardly, thereby decreasing the speed of the motor 17 and feed water pump 16, thereby compensating for the increase in the volume occupied below the water level due to the boiling of the water. If the high load continues for only a short time and then drops back to a lower rating, the water line in the boiler will then be depressed and the rheostat 77 will be adjusted to increase the speed of the motor 17 and feed water pump 16 beyond what it would otherwise have, so as to bring the water level in the boiler back to normal upon the resumption of the lower rating.

If the high rating is continued, the rheostat 77 will reduce the speed of the boiler feed pump until the water level has been restored to normal, after which the contact arm 79 will assume a position corresponding to normal water level and the speed of the boiler feed pump will be regulated entirely in accordance with the variation in the load through the motor generator set. When the boiler drops from the high rating back to a moderate rating the rheostat 77 will then increase the speed of the boiler feed pump motor to bring up the water level to normal, after which the arm 79 will assume a neutral position. The individual rheostats 77 and their operating means also serve to correct inequalities in the feed between different boilers. For example, if the feed water pump at one boiler tends to supply too much water and this tendency is not corrected by the attendant through the manually operable rheostat 76, the rheostats 77 will tend to slow down the pump and prevent the water level from getting too high.

The rheostats 77, as above pointed out, are capable of furnishing only a minor percentage of the total regulations of the motor 17 of the feed water pumps. Consequently the main variations in the feed water supply will be controlled by the motor generator set so that the feed water supplied to the individual boilers will vary in accordance with the demand for steam on the whole battery. It has been found that where the feed water regulation to each boiler has been controlled solely in accordance with the water line in such boiler, that an equalization of the water supply over the entire battery cannot be attained but that the water will be supplied unevenly to the several boilers. This unevenness of water supply tends to disturb the uniform output of steam by all of the boilers. The feed water supply system of the present invention equalizes the feed water supply over the entire battery, so that if there is a greater demand for steam, then substantially equal quantities of feed water will be supplied simultaneously to all of the boilers, thus preventing one boiler from getting a greater proportion of feed water and thereby chilling it with relation to another boiler, The generator 32 has a series field 80 of such strength that its voltage at any given speed will be maintained constant irrespective of the number of boiler and feed pump motors whose fields are thrown upon the generator 32.

The battery of boilers will ordinarily be operated to meet permanent or semi-permanent variations in load by putting the requisite number of units into commission. The units which are out of commission will ordinarily have their fires banked and the draft, stoker and feed water motors disconnected. As above pointed out the generators of the motor generator set are so designed as to excite the fields of a variable number of motors while maintaining a predetermined voltage on such fields for any particular speed of the motor generator set. The regulation of the battery in accordance with the steam pressure is thereby rendered independent of the number of units being operated.

The operation of the apparatus will first be described generally and then the computations for determining the various constants of the system will be explained.

The steam pressure regulator 21 responds to variations in the steam pressure in the main header 23, the arm 38 taking different positions for different steam pressures.

The regulator is set to travel through a complete stroke by a predetermined pressure variation. For example, if this pressure variation is taken as ten pounds, the arm 38 will be at its bottom position when the pressure is five pounds below normal and will be at top position when the pressure is five pounds above normal. Since the flow of steam out of a boiler can be anything from zero to maximum at practically the same steam pressure at the outlet, and since there is a definite loss or drop of steam pressure in flowing through a pipe, the connection 22 to the regulator 21 is preferably taken from the steam header 23 at a point where, at the maximum load on the battery, the pressure drop to that point from the boilers is approximately that for which the regulator is set to make a full stroke. Under these conditions, with no load on the battery, the pressure at the boilers and at this point will be the same and slightly above normal, whereas at a maximum load the pressure at the point where the connection 22 is taken off will be lower than that at the boilers by approximately the number of pounds required for a full stroke of the pressure regulator. By so tapping the connection to the steam pressure regulator, the regulator will closely follow the load on the station. In place of using a regulator operated by the steam pressure, a regulator otherwise operated in accordance with the load on the battery may be employed if desired.

As the load on the battery decreases, the arm 38 of the steam pressure regulator rises, thereby increasing the resistance of the rheostat 36 and weakening the field of the motor 34 of the motor generator set. The speed of the motor generator set therefore increases and thereby increases the voltage of the motor generators 30, 31, 32 and 33. These voltage increases in turn increase the field strengths of the stoker, the forced draft fan, the induced draft fan and the feed water pump motors, thereby decreasing such motor speeds so that less fuel, air and water is supplied to the furnaces to compensate for the decreased load on the station. Conversely, if the load on the station increases the arm 38 of the steam pressure regulator descends cutting resistance out of the rheostats 36 and decreasing the speed of the motor generator set. This in turn decreases the voltage supplied to the fields of the stoker fan and pump motors, thereby increasing their feeds and supplying more fuel, air and water to carry the increased load on the boilers.

The speed of all of the individual stoker, fan and pump motors of the several units of the battery are controlled through the motor generator electric system from the single master steam pressure regulator 21, which is in turn controlled by the pressure in the main steam header 23. The rate of combustion and water supply over the entire battery will therefore be varied in accordance with the load carried by the entire battery. The variations in the speed of the motor generator set cause properly correlated variations in the speeds of the motors of all of the units, so that the variations in the fuel, air and water supplies for different rates of combustion are properly equalized over the entire battery. The motors of each unit have their own adjustable hand rheostats so that any motor may be adjusted relatively of the other motors of its system and the load can be very accurately equalized over the several boilers of the entire battery. The change in the speed of the motor generator due to the variations in the load does not affect the equal distribution of the load between the several units, as changes in the speed of the motor generator cause proportionate changes in speed of the motors of all of the units.

When the manually adjusted rheostats for the different units are set, the operation of the system is entirely automatic and the hand rheostats will not need to be touched until there is some permanent or semi-permanent change in the operating conditions.

The system not only equalizes the load over the several units of the battery but also supplies properly correlated amounts of fuel, air and water at different rates of combustion, whereby the most efficient operation of the boilers and their furnaces is maintained over the entire boiler ratings from minimum to maximum. The feed water pumps of the several units have their speeds varied as a whole system in accordance with the load, which, of course, corresponds to the amount of water removed from the battery as steam. This control serves to equalize the water supply among the several units, the supply being proportioned to the amount of water removed as steam. This is the main regulation of the feed water pumps. It is modified slightly to correct for variations in the water feed level caused by frothing or priming when the load is increased to very high ratings. This corrective factor, however, does not disturb the equalization of the water supply over the entire battery, since the speeds of all of the booster pump motors are primarily controlled by a single master governor.

The constants of the illustrated system are determined as follows:—

For purposes of explanation, a number of curves, Figs. 2 to 15, inclusive, are presented.

It is to be understood that these curves are merely diagrammatic and are used for the purpose of more graphic explanation. They are not intended to be accurately drawn to scale.

Figure 2:
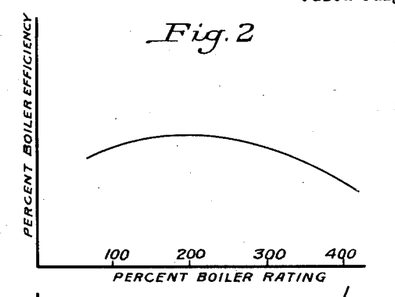
Figures 2 to 15, inclusive, are curves illustrating how the constants of the system are computed.
Figure 3:
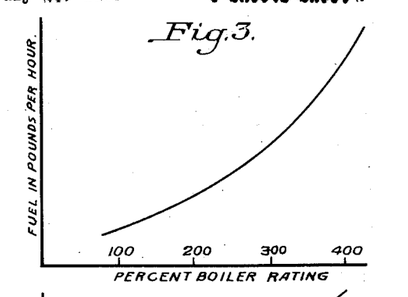

A curve of the efficiency of the boiler or boilers to be controlled is to be obtained. This is ordinarily obtainable from actual tests of boilers previously installed. A typical curve of this kind is shown in Figure 2, in which the percent boiler ratings are indicated by the abscissæ and the percent boiler efficiency at the various ratings are indicated by the ordinates. With this curve as a basis, the actual quantity of coal of known analysis which will be required for the different ratings of the boilers may be computed. Such a curve representing the relation between the quantity of fuel in pounds per hour and the percentage boiler rating is shown in Figure 3.

Figure 4:
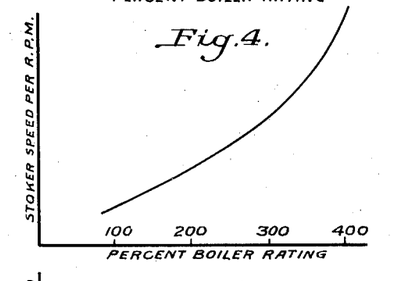

From the knowledge of the quantity of fuel which must be supplied per hour at different boiler ratings, the stoker speeds at the different boiler ratings may be computed. The curve showing the relation of the stoker speed in revolutions per minute at different boiler ratings, is shown in Figure 4. This curve furnishes the basis upon which the speeds of the stoker motor at different ratings of combustion are computed.

Figure 5:
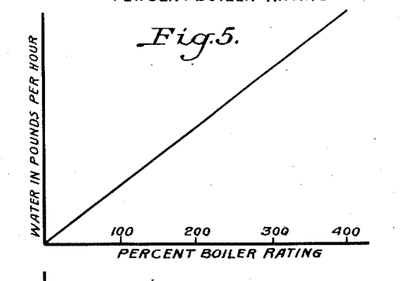
Figure 6:
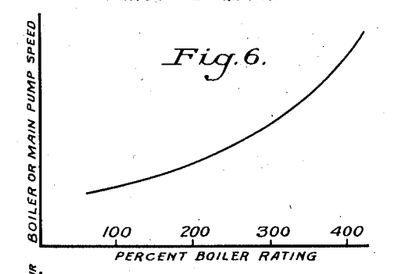
Figure 7:
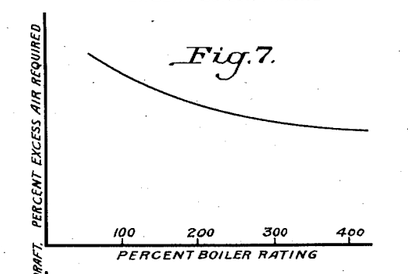

Since the amount of steam supplied is directly dependent upon the load, the feed water supply in pounds per hour will be directly proportional to the boiler rating as shown in Figure 5. A pump will not ordinarily supply water in exact proportion to the pump speed, consequently a curve of the pump speed necessary to supply the proper amounts of water at the different boiler ratings must be computed as shown in Figure 6. The data for this curve can be obtained from the pump manufacturers or from tests. This data fixes the speed of the booster pump and its motor for the different rates of combustion.

Figure 8:
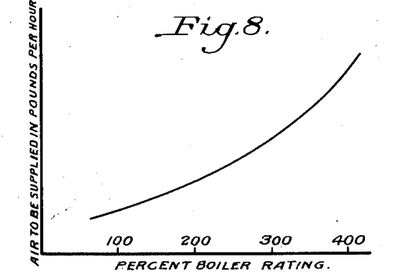

From tests conducted for obtaining the data necessary to plot the curve of Figure 2, the percentage of excess air required to burn the fuel most efficiently at different boiler ratings is determined. The relationship of the excess air to the different boiler ratings is indicated in the curve shown in Figure 7. The curve shown in Figure 8 is then plotted with curves 3 and 7 as a basis. This curve shows the quantity of air in pounds per hour which must be delivered to the furnace at different boiler ratings.

Figure 9:
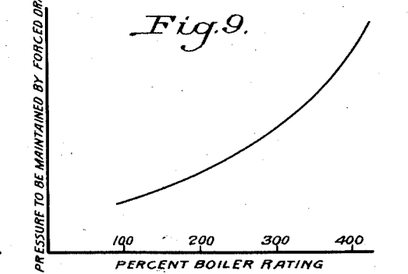
Figure 10:
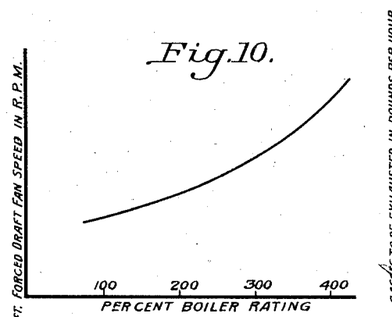

The fuel bed thicknesses for the different percentage boiler ratings are determined for the most efficient combustion and the static pressures under which the forced draft fan must operate at the different boiler ratings are then determined. A curve showing the pressure in inches of water to be maintained under the fire by the forced draft fan at the different boiler ratings, is shown in Figure 9. The curve in Figure 10, which shows the speed of the forced draft fans at the different boiler ratings is then calculated on the basis of the curves of Figures 8 and 9. This curve furnishes the basis for computing the electrical constants of the forced draft fan motors and their regulating system. The quantity of burned gases to be removed by the induced draft fans at the different ratings of combustion or boiler ratings is then computed. Since the exact quantities of air and fuel supplied to the furnaces have been fixed, a quantity of the gases of combustion is known. In plotting the curve of Figure 11, allowance must be made for the infiltration of air through the boiler setting and economizer. Such infiltration increases with the boiler rating. The curve in Figure 11 is plotted showing the pounds per hour of the gases of combustion to be removed by the induced draft fans at different boiler ratings.

Figure 12:
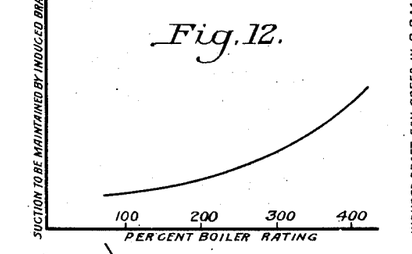

The curve shown in Figure 12 is plotted from data obtained from tests with the boiler. This curve shows the negative stack pressures in inches of water under which the induced draft fan will operate at different boiler ratings.

Figure 11:
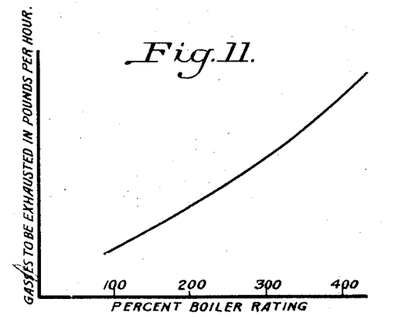
Figure 13:
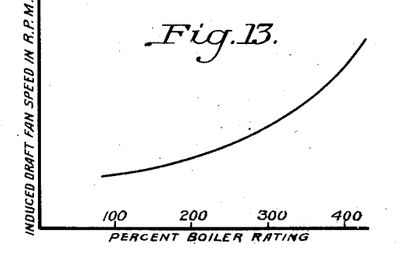

The curve of Figure 13 is next plotted on the basis of Figures 11 and 12. This curve shows the induced draft fan speeds in revolutions per minute at the different boiler ratings. In plotting this curve the temperatures of the gases to be handled by the fan are taken into consideration. The temperature of the gases increases with the boiler rating. For example, the gas temperature may increase from 350° F. at 100% boiler rating to 600° F. at 400% boiler rating.

Figure 14:
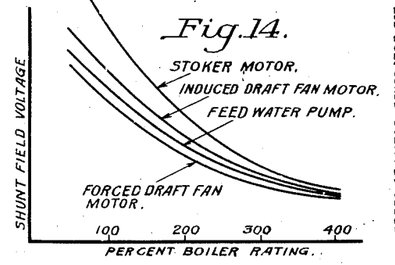

Since the pressures and amounts of air and gas can be determined for the different boiler ratings, fans having the best characteristics for carrying the loads may be selected. Various fan manufacturers furnish data for the different types of fans, upon which data the speed of the fans both for the forced and induced drafts may be accurately computed at the different boiler ratings. The speeds required at the different boiler ratings by the stokers, the forced draft fans, the induced draft fans and the booster pumps, together with the loads to be carried at such speeds being known, electric motors of the proper size and range of speed may be selected. Motors are also selected having desirable shunt field characteristics, to give the proper speed regulation by varying the field voltage supplied to the motors. Since the speeds of the stoker, forced draft fan, induced draft fan and feed pump motors at different boiler ratings is known, and since their shunt field characteristics are known, curves may be plotted showing the voltage which must be supplied to the shunt field winding of the motors at different boiler ratings to obtain the proper speed of the several motors. Typical curves showing this relationship are illustrated in Figure 14. In the example selected, the stoker motor has the greatest variation in speed over the different boiler ratings. The feed water pump motor, the next largest variation, the induced draft fan motor next, and the forced draft fan the least variation. These speed variations are determined very largely by the characteristics of the fans and pumps, and for fans and pumps of some other characteristics these relative speed relations may be different. Since the voltages which must be supplied to the various motors are known, suitable generators 30, 31, 32 and 33 are selected. The speeds of the generators necessary to supply the voltages required by the curves of Figure 14 may be then computed. Since the voltage curves for the shunt fields of the stoker, the feed water pump, the forced draft and induced draft fan motors have different slopes, and since the generators 30, 31, 32 and 33 are mounted on the same shaft, the necessary voltage regulation cannot in general be attained for all four generators by the speed variation of the motor generator set alone. Therefore, the voltage for one set of motors, say the stoker motors, is obtained by the speed control of the motor generator set and the voltages for the fields of the pump, forced draft fan and induced draft fan motors are regulated by the speed of the motor generator set as modified by the rheostats 54, 64 and 74.

Figure 15:
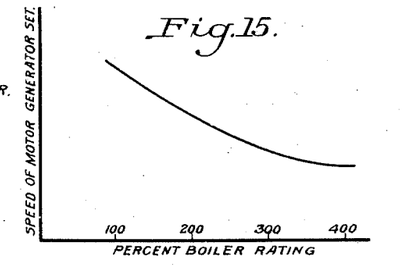

On the basis of the curve of the stoker shunt field voltage shown in Figure 14, the curve of Figure 15 is computed. This curve shows the speed in revolutions per minute of the generator 33 at different boiler ratings. This fixes the speed of the motor generator set. From the characteristics of the motor 34 of the motor generator set, the resistance values of the elements of the rheostat 36 may be computed. The steam pressure regulator 21, by means of the movable contact 37, will therefore impart to the motor generator set the correct speeds for the different boiler ratings. Since the speed of the motor generator set is fixed by the stoker motors and their generator 33, the voltage of the generators supplying the fields of the pump motors and fan motors must be modified to give the proper variation in the shunt field voltage, as shown in Figure 14. With Figure 14 as a basis, the values of the resistance elements of the rheostats 54, 64 and 74 are computed, so that the voltages of the generators 30, 31 and 32 will be properly modified. While for the accurate proportion of the air, fuel and water supply at different rates of combustion, it is necessary in most cases to employ the voltage modified rheostats, 54, 64 and 74, these might be dispensed with in case the stokers, feed water pumps and fans and their motors had such characteristics that the curves of Figure 14 were substantially parallel.

From the foregoing description it will be apparent that an accurate equalization of the water, as well as the air and fuel supplies to the several units, is provided for and at all rates of combustion. This regulation results in the maximum efficiency of the individual boilers and insures that each boiler of the battery will carry its proportion of the load and not more. While the invention has been described as embodied in the control of the usual steam boiler, it will be understood that the broader features of the invention are applicable to boilers using liquids other than water, as, for example, the recently developed mercury boiler.

While the invention has been described in considerable detail with reference to its illustrated embodiment, it is to be understood that the invention is not limited to such embodiment but may be otherwise embodied within the scope of the following claims.

I claim:

1. The method of controlling a battery of boiler furnaces which includes utilizing a function of the battery to effect the supply of fuel, air and liquid required by the various boilers and their furnaces at any rating, and compensating for the individual characteristics of a furnace in the battery by a supplemental regulation to vary the rate of supply of fuel, air and liquid from the normal imposed by the centralized control while leaving such furnace still susceptible to the centralized control.

2. The method of controlling a battery of boilers which includes utilizing a function of the battery to effect the supply of the liquid required by the various boilers at any rating, and compensating for the individual characteristics of a boiler in the battery by a supplemental regulation to vary the rate of supply of liquid from the normal imposed by the centralized control while leaving such boiler still susceptible to the centralized control.

3. The method of operating a battery of boilers which includes adjusting a control means in accordance with the demand on the battery, utilizing said control means to automatically regulate the supply of liquid to all of the boilers in the battery in accordance with such demand, and supplementally regulating the rate of supply of liquid to at least one boiler to compensate for its individual characteristics while leaving it susceptible to the centralized control.

4. The method of operating a battery of boilers which includes adjusting a control means in accordance with variations in pressure in the header of the battery, utilizing said control means to automatically regulate the rate of supply of liquid to all of the boilers in accordance with such variations in pressure, and supplementally regulating the rate of supply of liquid to at least one boiler to compensate for its individual characteristics while leaving it susceptible to the centralized battery control.

5. The method of operating a battery of boilers having independently driven means for each boiler for supplying liquid to the boiler which includes utilizing a function of the battery to control all of said independently driven means, and compensating for the individual characteristics of a boiler in the battery by a supplemental regulation to vary the rate of supply of liquid from the normal imposed by the centralized control while leaving such boiler still susceptible to the centralized control.

6. The method of operating a battery of boilers having independent means for each boiler for supplying liquid thereto and having an electric motor for operating each of such supply means which includes supplying current to a winding of each motor, and varying such current in accordance with a function of the battery and in accordance with a condition appertinent to the individual boiler with which the motor is associated.

7. The method of operating a battery of boilers having independent means for each boiler for supplying liquid to the boiler and having an electric motor for operating each of such supply means which includes supplying current to a winding of each motor, varying such current in accordance with a function of the battery, and supplementally controlling the current supplied to at least one of the motors to compensate for the individual characteristics of its boiler.

8. The combination with a battery of boilers of liquid supply means for each boiler, at least one electric motor associated with each boiler for driving the same, and means for automatically controlling the speeds of the motors, comprising means for supplying to a winding of each motor electric current having its voltage controlled in accordance with a function of the battery and in accordance with a condition appertinent to the individual boiler with which the motor is associated.

9. The combination with a battery of boilers of liquid supply means for each boiler, electric motors for driving the same, means for automatically controlling the speeds of the motors comprising means for supplying to a winding of each motor electric current having its voltage controlled in accordance with a function of the battery, and means for supplementally controlling at least one of such motors while leaving it susceptible to the centralized battery control.

10. The combination with a battery of boiler furnaces of air, fuel and liquid supplying means for each furnace, electric driving motors therefor, a common control means therefor comprising generators having their output varied in accordance with a function of the battery, said generators being connected with the air, fuel and liquid supplying motors to correspondingly vary their speeds, and means for varying the speeds of the motors for the liquid supplying means independently of said common control means.

11. The combination with a battery of boiler furnaces of air, fuel and liquid supplying means for each furnace, electric driving motors therefor, a common control means therefor comprising generators having their output varied in accordance with a function of the battery, said generators being connected with the air, fuel and liquid supplying motors to correspondingly vary their speeds, and means for independently regulating the speeds of the individual motors.

12. The combination with a battery of boiler furnaces of air, fuel and liquid susplying means for each furnace, an electric driving motor for each of such means, a plurality of generators having their outputs varied in accordance with a function of the battery, one of the generators being connected with the air supply means so as to vary the speed of their motors in accordance with said function of the battery, another generator being connected with the fuel supply motors and adapted to vary the speeds of their motors in accordance with said function, and another generator being connected to the liquid supply motors and adapted to vary the speeds of their motors in accordance with said function, and means for varying the speeds of the motors for the liquid supplying means independently of said common control means.

13. The combination with a battery of boiler furnaces of air, fuel and liquid supplying means for each furnace, an electric driving motor for each of such means, and a plurality of generators having their outputs varied in accordance with a function of the battery, one of the generators being connected with the air supply means so as to vary the speed of their motors in accordance with said function of the battery, another generator being connected with the fuel supply motors and adapted to vary the speeds of their motors in accordance with said function, and another generator being connected to the liquid supply motors and adapted to vary the speeds of their motors in accordance with said function, and means for varying the effect of at least one of the generators upon its connected motors.

14. The combination with a battery of boiler furnaces of air, fuel and liquid supplying means, electric driving motors therefor, and a common controlling means comprising a motor generator set having its output varied in accordance with a function of the battery, the generators of such set being connected with the air, fuel and liquid supplying motors to correspondingly vary their speeds.

15. The combination with a battery of boiler furnaces of air, fuel and liquid supplying means, electric driving motors therefor, a common controlling means comprising a motor generator set having its output varied in accordance with a function of the battery, the generators of such set being connected with air, fuel and liquid supplying motors to correspondingly vary their speeds, and means for independently regulating the speed of the individual motors.

16. The combination with a battery of boiler furnaces of independently driven air, fuel and liquid supplying means for each furnace adapted to supply air, fuel and liquid to such furnace in desired proportions for a given load, a centralized controlling means for said supply means acting automatically to supply approximately equal amounts of fuel, air and liquid to each of the individual boiler furnaces in predetermined proportion, and means for supplementally controlling the proportion of air, fuel and liquid supplied to any furnace while leaving its supplying means susceptible to the centralized control.

17. The combination with a battery of boiler furnaces of independently driven air, fuel and liquid supplying means for the individual boiler furnaces in the battery, control means actuated in accordance with a function of the battery, and effective for controlling all of the supply means, and means for modifying the effect of said control means on the supply means for the individual furnaces.

18. The combination with a battery of boiler furnaces of independently driven fuel, air and liquid supplying means for the individual boiler furnaces in the battery, control means actuating in accordance with a function of the battery effective for controlling all of the supply means and tending toward the supply of fuel, air and liquid to all of the boiler furnaces in a predetermined ratio, and means associated with an individual furnace for modifying the ratio imposed by said control means on such furnace.

19. The method of operating a battery of furnaces which includes controlling the rate of supply of air, fuel and liquid to the boiler furnaces in the battery in accordance with a function of the battery, and supplementally controlling at least one furnace in the battery to cause a departure from such rate of supply for that furnace to compensate for its individual characteristics and divide the load uniformly over the furnaces constituting the battery.

20. The method of operating a battery of boilers each having a motor for supplying liquid thereto which includes varying the speeds of the motors in accordance with a function of the battery, and supplementally regulating the speed of at last one motor to compensate for the individual characteristics of its boiler.

21. The combination with a battery of boiler furnaces of a liquid pump for each boiler, an individual driving means for each pump, a fuel supplying device for each furnace, an individual driving means for the fuel supplying device of each furnace, an air supplying device for each furnace, an individual driving means for the air supply of each furnace, a control means operating in accordance with a function of the entire battery, connections between said control means and the said several driving means, and means for varying the speeds of the pump driving means independently of said control means.

22. The combination with a battery of boilers of independently driven liquid supplying means for each boiler in the battery, a driving motor therefor, a common control means actuated in accordance with a function of the battery and effective for controlling all of such motors, and means for modifying the effect of the control means on at least one of the motors.

23. The combination with a battery of boiler furnaces of fuel, air and liquid supplying means for each boiler furnace in the battery, a set of motors, one for each boiler, for actuating the liquid supply means, a set of motors, one for each furnace, for actuating the fuel supply means, a set of motors, one for each furnace, for actuating the air supply means, centralized control means actuated in accordance with a function of the battery for controlling all of the motors, and means for varying the effect of the centralized control means on at least one of the sets of motors.

24. The combination with a battery of boiler furnaces of fuel, air and liquid supplying means for each boiler furnace in the battery, a set of motors, one for each boiler, for actuating the liquid supply means, a set of motors, one for each furnace, for actuating the fuel supply means, a set of motors, one for each furnace, for actuating the air supply means, centralized control means actuated in accordance with a function of the battery for controlling all of the motors, means for varying the effect of the centralized control means on at least one of the sets of motors, and means for varying the effect of said control means on an individual motor.

25. The method of operating a liquid boiler and its furnace which includes supplying fuel, air and liquid thereto in definite proportions at a given boiler rating, and automatically varying the ratio of fuel, air and liquid with changes in the boiler rating.

26. The method of operating a battery of liquid boilers and their furnaces which includes supplying fuel, air and liquid to each unit of the battery in definite proportions at a given load on the battery, and automatically varying the ratio of fuel, air and liquid with variations in the battery load.

27. The method of operating a battery of liquid boilers and their furnaces which includes supplying fuel, air and liquid to each boiler in definite proportions at a given load on the battery, automatically varying such proportions with variations in the load on the battery, and individually varying the proportions for a unit in the battery to compensate for its individual characteristics while leaving it susceptible to said automatic variation.

28. The method of operating a liquid boiler and its furnace which includes supplying fuel, air and liquid in a definite ratio at a given boiler rating, automatically varying such ratio with changes in the boiler rating, and providing a supplemental regulation on the liquid supply to maintain the liquid level in the boiler within definite limits.

29. The combination with a liquid boiler and its furnace, of air supply means fuel supply means and liquid supply means, means varying with a function of the load, and control means operatively connected therewith and responsive thereto, the control means being adapted to vary the ratio of fuel, air and liquid supplied to the unit as said control means is varied by the function responsive means.

30. The combination with a liquid boiler and its furnace, of air supply means, fuel supply means and liquid supply means, means responsive to a function of the load, and a plurality of control means operatively connected therewith, there being a control means for each of the air, fuel and liquid supply means, said control means being adapted to vary at different rates as the function responsive means varies.

31. The combination with a battery of liquid boilers and their furnaces, of air supply means, fuel supply means and liquid supply means for each unit in the battery, means varying with a function of the battery load, an air supply control means, a fuel supply control means, and a liquid supply control means for all of the units in the battery, the three control means being operatively connected with the function responsive means and responsive thereto, the supply means being adapted to vary in different amounts as the function responsive means varies, whereby the ratio of fuel, air and liquid supplied to the units is varied.

32. The combination with a battery of liquid boilers and their furnaces, of air supply means, fuel supply means and liquid supply means for each unit in the battery, means varying with a function of the battery load, an air supply control means, a fuel supply control means, and a liquid supply control means for all of the units in the battery, the three control means being operatively connected with the function responsive means and responsive thereto, the supply means being adapted to vary in different amounts as the function responsive means varies whereby the ratio of fuel, air and liquid supplied to the units is varied, and means for individually adjusting any of the control means while leaving it susceptible to variation by the function responsive means.

33. The combination with a battery of liquid boilers and their furnaces, of air, fuel and liquid supplying means, electric driving motors therefor, and a common controlling means therefor comprising a motor generator set having its generator voltage varied in accordance with the demand on the battery and having its generators connected with the air, fuel and liquid supplying motors to correspondingly vary their speeds, and means for independently regulating the speeds of the individual motors.

34. The combination with a battery of liquid boilers and their furnaces, of an independently driven liquid pump for each boiler, a common controlling means actuated in accordance with the demand on the entire battery, and a supplemental regulator for each boiler actuated in accordance with the liquid level therein for exercising a secondary control on the liquid pump for such boiler.

35. The combination with a battery of liquid boilers and their furnaces, of a liquid pump for each boiler, an electric motor for driving each pump, a common electric control for simultaneously varying the speeds of all the motors in accordance with the demand on the entire battery, and means for adjusting the speeds of the motors individually.

36. The combination with a battery of liquid boilers and their furnaces, of air, fuel and liquid supplying means, electric driving motors therefor, a common electric control therefor comprising electric generating means having its voltage varied in accordance with the demand on the battery and connected with the air, fuel and liquid supplying motors to correspondingly vary their speeds, and means for varying the speeds of the motors which drive the liquid supplying means independently of said common electric control.

37. The combination with a battery of liquid boilers and their furnaces, of a liquid feed pump for each boiler and electric means for driving each pump, a common electric control therefor comprising electric generating means having its voltage controlled in accordance with the demand on the battery and connected with the motors to correspondingly vary their fields, and means for varying the speeds of said motors which drive the liquid feed pumps independently of said common electric control.

In testimony whereof, I have hereunto set my hand.

MERRILL G. BENJAMIN.